United States Patent
Ohata et al.

(10) Patent No.: US 11,802,772 B2
(45) Date of Patent: Oct. 31, 2023

(54) ERROR ESTIMATION DEVICE, ERROR ESTIMATION METHOD, AND ERROR ESTIMATION PROGRAM

(71) Applicant: DENSO CORPORATION, Kariya (JP)

(72) Inventors: Ryusuke Ohata, Kariya (JP); Kiyoto Noguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/658,076

(22) Filed: Apr. 5, 2022

(65) Prior Publication Data
US 2022/0228871 A1 Jul. 21, 2022

Related U.S. Application Data

(63) Continuation of application No. PCT/JP2020/037852, filed on Oct. 6, 2020.

(30) Foreign Application Priority Data

Oct. 8, 2019 (JP) .................................. 2019-185387

(51) Int. Cl.
*G01C 21/30* (2006.01)
*H04N 23/68* (2023.01)

(52) U.S. Cl.
CPC ........... *G01C 21/30* (2013.01); *H04N 23/689* (2023.01)

(58) Field of Classification Search
CPC ........ G01C 21/30; G01C 25/00; G01C 21/28; G01C 21/183; G01C 25/005; H04N 23/689; G01S 7/4808; G01S 17/89
See application file for complete search history.

(56) References Cited

U.S. PATENT DOCUMENTS

| | | | |
|---|---|---|---|
| 2014/0260517 A1* | 9/2014 | Demerly | G01C 25/005 73/1.38 |
| 2015/0237479 A1* | 8/2015 | Fung | G06T 7/246 455/456.6 |
| 2015/0317838 A1* | 11/2015 | Foxlin | G06T 19/006 345/633 |
| 2015/0369609 A1* | 12/2015 | Roumeliotis | G06T 7/277 701/400 |
| 2016/0291134 A1 | 10/2016 | Droz et al. | |
| 2017/0031032 A1 | 2/2017 | Garin et al. | |
| 2018/0143682 A1* | 5/2018 | Larson | G02B 27/0172 |
| 2018/0149732 A1 | 5/2018 | Droz et al. | |
| 2020/0264011 A1* | 8/2020 | Lu | G06V 10/40 |

* cited by examiner

*Primary Examiner* — Michael E Teitelbaum
(74) *Attorney, Agent, or Firm* — MASCHOFF BRENNAN

(57) ABSTRACT

An error estimation device includes an error prediction unit and a determination unit. The error prediction unit is configured to predict a bias error occurring in an inertial sensor mounted in a vehicle. The determination unit is configured to determine whether the bias error needs to be repredicted by the error prediction unit based on a reflection distance image acquired by an optical sensor in a rolling shutter mode and an outside light image acquired by an external camera in a global shutter mode.

27 Claims, 9 Drawing Sheets

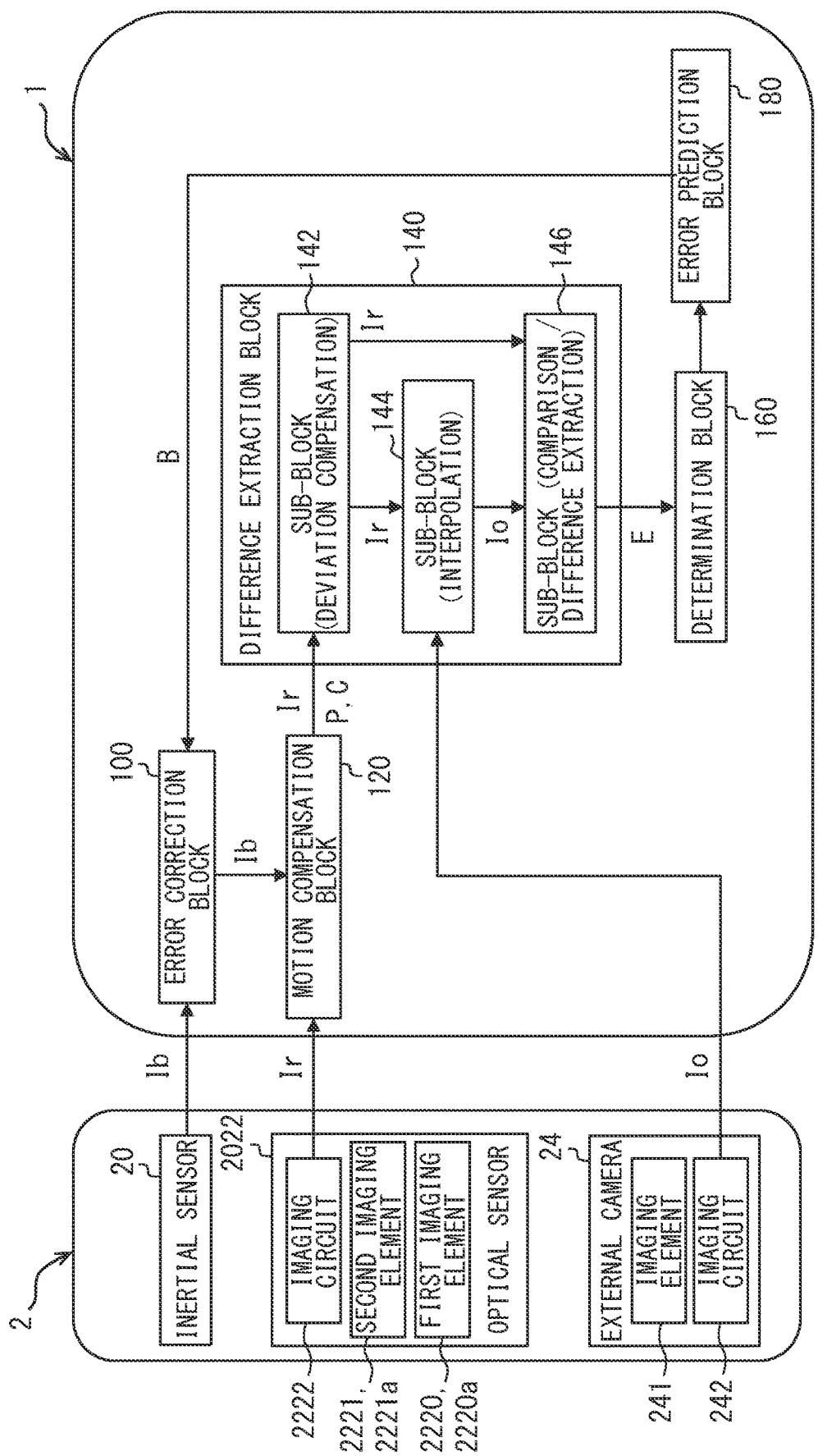

ERROR ESTIMATION DEVICE, ERROR ESTIMATION METHOD, AND ERROR ESTIMATION PROGRAM

CROSS REFERENCE TO RELATED APPLICATION

The present application is a continuation application of International Patent Application No. PCT/JP2020/037852 filed on Oct. 6, 2020, which designated the U.S. and claims the benefit of priority from Japanese Patent Application No. 2019-185387 filed on Oct. 8, 2019. The entire disclosures of all of the above applications are incorporated herein by reference.

TECHNICAL FIELD

The present disclosure relates to an estimation process for a bias error occurring in an inertial sensor.

BACKGROUND

In recent vehicles, an optical sensor configured to acquire a reflection distance image according to a distance to a reflection point of light sensed from an outside of the vehicle and an external camera configured to acquire an outside light image according to outside light sensed from an outside are mounted in the vehicle together with an inertial sensor configured to acquire inertial information. In a general technique, the bias error occurring in the inertial sensor due to temperature changes is corrected, for example.

SUMMARY

According to a first aspect of the present disclosure, an error estimation device is configured to perform an estimation process for a bias error occurring in an inertial sensor configured to acquire inertial information. The inertial sensor is mounted in a vehicle together with an optical sensor and an external camera. The optical sensor is configured to acquire a reflection distance image according to a distance to a reflection point of light sensed from an outside of the vehicle. The external camera is configured to acquire an outside light image according to outside light sensed from the outside. The error estimation device includes an error prediction unit and a determination unit. The error prediction unit is configured to predict the bias error. The determination unit is configured to whether the bias error needs to be repredicted by the error prediction unit based on the reflection distance image acquired by the optical sensor in a rolling shutter mode and the outside light image acquired by the external camera in a global shutter mode.

According to a second aspect of the present disclosure, an error estimation device is configured to perform an estimation process for a bias error occurring in an inertial sensor configured to acquire inertial information. The inertial sensor is mounted in a vehicle together with an optical sensor and an external camera. The optical sensor is configured to acquire a reflection distance image according to a distance to a reflection point of light sensed from an outside of the vehicle. The external camera is configured to acquire an outside light image according to outside light sensed from the outside. The error estimation device includes an error prediction unit, an error correction unit, a motion compensation unit, a difference extraction unit, and a determination unit. The error prediction unit is configured to predict the bias error. The error correction unit is configured to correct the inertial information using the predicted bias error. The motion compensation unit is configured to compensate, for a movement amount of the vehicle in a shutter frame when the outside light image is acquired by the external camera in a global shutter mode in which all pixels of the external camera are exposed simultaneously, the reflection distance image acquired in the shutter frame by the optical sensor in a rolling shutter mode in which pixels of the optical sensor are exposed sequentially, based on the corrected inertial information. The difference extraction unit is configured to extract a difference between the compensated reflection distance image and the outside light image by comparing the compensated reflection distance image and the outside light image. The determination unit is configured to determine, based on the extracted difference, whether to return the estimation process to a step of predicting the bias error by the error prediction unit.

According to a third aspect of the present disclosure, a method is for performing an estimation process for a bias error occurring in an inertial sensor configured to acquire inertial information. The inertial sensor is mounted in a vehicle together with an optical sensor and an external camera, the optical sensor is configured to acquire a reflection distance image according to a distance to a reflection point of light sensed from an outside of the vehicle, and the external camera is configured to acquire an outside light image according to outside light sensed from the outside. The method includes predicting the bias error, and determining whether the bias error needs to be repredicted based on the reflection distance image acquired by the optical sensor in a rolling shutter mode and the outside image acquired by the external camera in a global shutter mode.

According to a fourth aspect of the present disclosure, a method is for performing an estimation process for a bias error occurring in an inertial sensor configured to acquire inertial information. The inertial sensor is mounted in a vehicle together with an optical sensor and an external camera, the optical sensor is configured to acquire a reflection distance image according to a distance to a reflection point of light sensed from an outside of the vehicle, and the external camera is configured to acquire an outside light image according to outside light sensed from the outside. The method includes predicting the bias error. The method includes correcting the inertial information using the predicted bias error. The method includes compensating, for a movement amount of the vehicle in a shutter frame when the outside light image is acquired by the external camera in a global shutter mode in which all pixels of the external camera are exposed simultaneously, the reflection distance image acquired in the shutter frame by the optical sensor in a rolling shutter mode in which pixels of the optical sensor are exposed sequentially, based on the corrected inertial information. The method includes extracting a difference between the compensated reflection distance image and the outside light image by comparing the compensated reflection distance image and the outside light image. The method includes determining, based on the extracted difference, whether to return the estimation process to the step of predicting the bias error.

According to a fifth aspect of the present disclosure, a computer program product is for performing an estimation process for a bias error occurring in an inertial sensor configured to acquire inertial information. The inertial sensor is mounted in a vehicle together with an optical sensor and an external camera, the optical sensor is configured to acquire a reflection distance image according to a distance to a reflection point of light sensed from an outside of the vehicle, and the external camera is configured to acquire an outside light image according to outside light sensed from the outside. The computer program product includes instructions configured to, when executed by at least one processor, cause the at least one processor to predict the bias error, and determine whether the bias error needs to be repredicted based on the reflection distance image acquired by the optical sensor in a rolling shutter mode and the outside image acquired by the external camera in a global shutter mode.

According to a sixth aspect of the present disclosure, a computer program product is for performing an estimation process for a bias error occurring in an inertial sensor configured to acquire inertial information. The inertial sensor is mounted in a vehicle together with an optical sensor and an external camera, the optical sensor is configured to acquire a reflection distance image according to a distance to a reflection point of light sensed from an outside of the vehicle, and the external camera is configured to acquire an outside light image according to outside light sensed from the outside. The computer program product includes instructions configured to, when executed by at least one processor, cause the at least one processor to predict the bias error. The instructions are configured to, when executed by the at least one processor, cause the at least one processor to correct the inertial information using the predicted bias error. The instructions are configured to, when executed by the at least one processor, cause the at least one processor to compensate, for a movement amount of the vehicle in a shutter frame when the outside light image is acquired by the external camera in a global shutter mode in which all pixels of the external camera are exposed simultaneously, the reflection distance image acquired in the shutter frame by the optical sensor in a rolling shutter mode in which pixels of the optical sensor are exposed sequentially, based on the corrected inertial information. The instructions are configured to, when executed by the at least one processor, cause the at least one processor to extract a difference between the compensated reflection distance image and the outside light image by comparing the compensated reflection distance image and the outside light image. The instructions are configured to, when executed by the at least one processor, cause the at least one processor to determine, based on the extracted difference, whether to return the estimation process to the step of predicting the bias error.

BRIEF DESCRIPTION OF THE DRAWINGS

FIG. 11 is a block diagram showing a detailed configuration of an error estimation device according to the second embodiment.

EMBODIMENTS

Comparative Example

In a comparative example of the present disclosure, an image captured by a camera is used for correcting the bias error as a visual inertia odometry. In the visual inertia odometry, it is necessary to track features in the image acquired by the camera for estimating the bias error to be corrected. When the image has few features, it may be difficult to secure the estimation accuracy of the bias error.

First Embodiment

Figure 1:
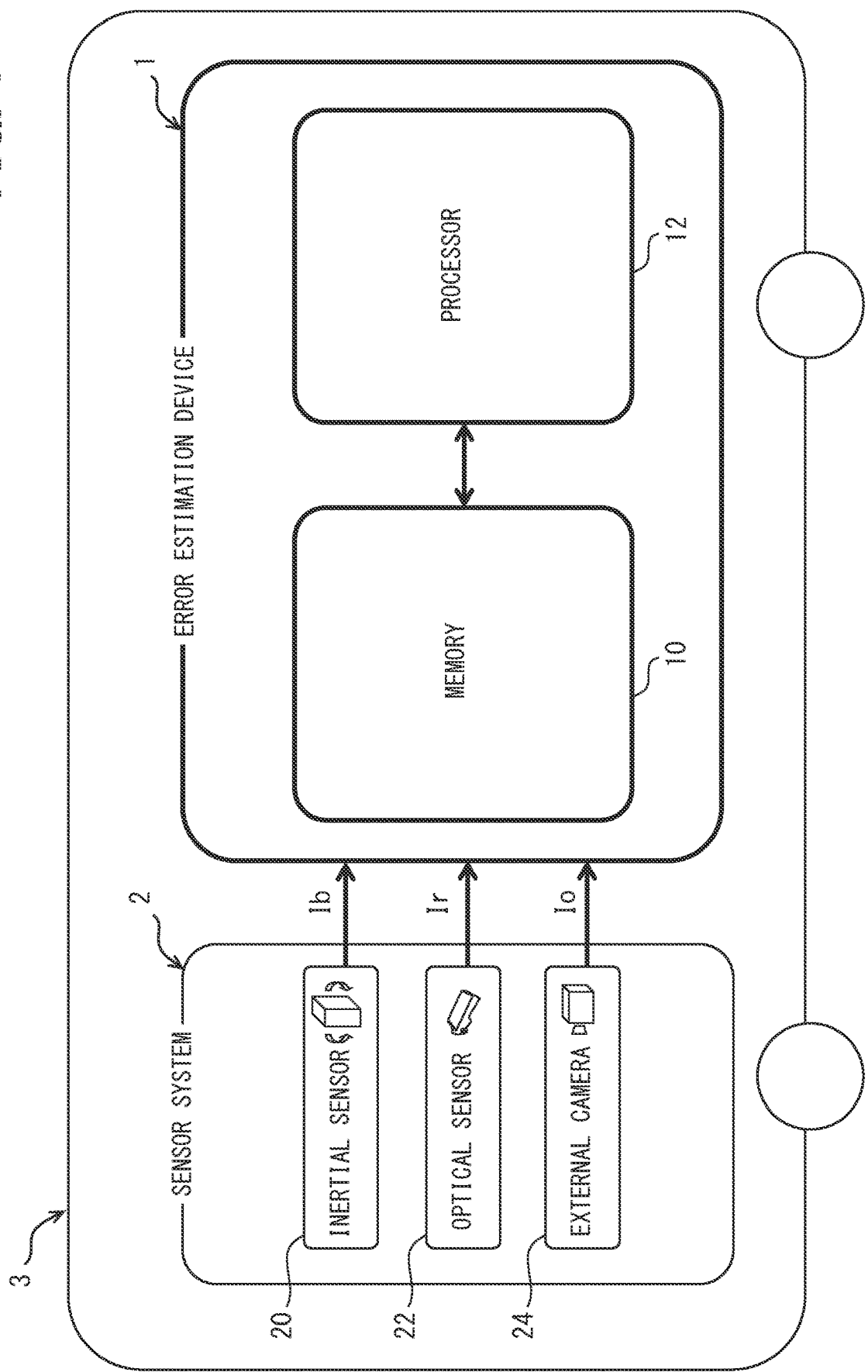
FIG. 1 is a block diagram showing an overall configuration of an error estimation device according to a first embodiment.

As shown in FIG. 1, an error estimation device 1 according to a first embodiment is mounted in a vehicle 3. The vehicle 3 is, for example, an advanced driver-assistance vehicle, an automated driving vehicle, or the like configured to travel based on a motion estimation such as a self-position estimation. In the following description, a left-right direction of the vehicle 3 on a horizontal plane is referred to as a horizontal direction, and a front-rear direction of the vehicle 3 on the horizontal plane is referred to as a front-rear direction. Further, a vertical direction of the vehicle 3 on the horizontal plane is referred to as a vertical direction.

Figure 2:
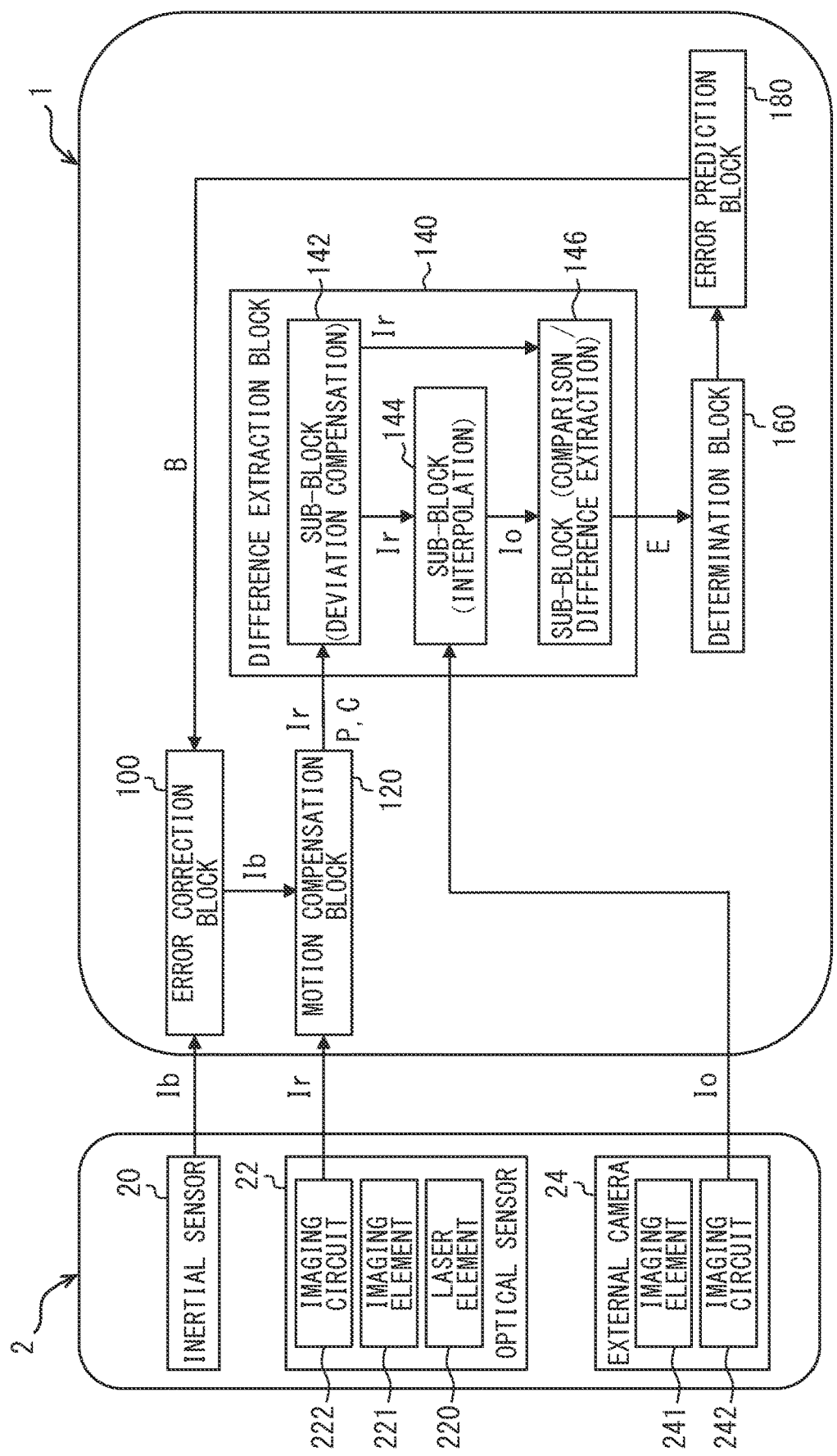
FIG. 2 is a block diagram showing a detailed configuration of the error estimation device according to the first embodiment.

A sensor system 2 is mounted in the vehicle 3 together with the error estimation device 1. As shown in FIGS. 1, 2, the sensor system 2 includes at least an inertial sensor 20, an optical sensor 22, and an external camera 24.

The inertial sensor 20 is, for example, a so-called IMU (Inertial Measurement Unit) configured to acquire inertial information Ib that can be utilized for the motion estimation of the vehicle 3. The inertial sensor 20 is configured to acquire, as the inertial information Ib, at least one of an angle, an angular velocity, or an angular acceleration of the vehicle 3 around three axes including the front-rear direction, the horizontal direction, and the vertical direction. The inertial sensor 20 includes at least one of a gyro sensor or an acceleration sensor, for example.

The optical sensor 22 of the first embodiment is a so-called LIDAR (Light Detection and Ranging/Laser Imaging Detection and Ranging) configured to acquire a reflection distance image Ir that can be utilized for the motion estimation of the vehicle 3. The optical sensor 22 is configured to emit the laser light to an outside of the vehicle 3 and receive a reflected light of the emitted laser light to acquire the reflection distance image Ir according to a distance (reflection point distance) to a reflection point at which the laser light is reflected. Accordingly, the reflection distance image Ir includes information indicating the distance to an object that reflected the laser light. As shown in FIG. 2, the optical sensor 22 includes a laser element 220, an imaging element 221, and an imaging circuit 222.

The imaging circuit 222 is configured to control an infrared laser light (hereinafter, referred to a laser light) that is emitted from the laser element 220 to the outside of the vehicle 3 in the form of an intermittent pulsed beam to scan within a beam steering angle in the horizontal direction. Along with this emission of the laser light, the imaging circuit 222 captures the image in the rolling shutter mode by exposing and scanning horizontally adjacent one or more vertical pixel lines of the imaging elements 221 according to the beam steering angle changing in the horizontal direction. That is, the rolling shutter is a shutter mode in which partial images of an image having a predetermined size are sequentially acquired in different times. The imaging circuit 222 is configured to acquire the reflection distance image Ir by converting, to data for each pixel associating with corresponding beam steering angle, a distance value to the reflection point corresponding to the time of flight of the reflected light sensed by exposed pixels of the imaging element 221. The time of flight of the reflected light is calculated from the time when the laser light is emitted and the time when the reflected light is sensed by the pixels.

The reflection distance image Ir may include the luminance value corresponding to the intensity of the reflected light sensed by each exposed pixel of the imaging element 221. The luminance value is converted by the imaging circuit 222 to data in association with the beam steering angle corresponding to each pixel. The imaging element 221 may be configured to capture an image by sensing the external light from the outside of the vehicle 3 during the interval of the intermittently emitted laser light. The reflection distance image Ir may include the luminance value corresponding to the intensity of the external light sensed by each exposed pixel of the imaging element 221. The luminance value is converted by the imaging circuit 222 to data in association with the beam steering angle corresponding to each pixel.

The external camera 24 is a so-called in-vehicle camera configured to acquire an outside light image Io that can be utilized for the motion estimation of the vehicle 3. The external camera 24 is configured to acquire the outside light image Io according to the intensity of the outside light by receiving and capturing the outside light from the outside of the vehicle 3. The external camera 24 includes the imaging element 241 and the imaging circuit 242.

The imaging circuit 242 captures the image in the global shutter mode by exposing and scanning the entire vertical pixel lines of the imaging element 241 at a time. That is, the global shutter is a shutter mode for acquiring an image having a predetermined size at a time. The imaging circuit 242 is configured to acquire the outside light image Io by converting, to data in association with the pixel angle corresponding to each pixel, the luminance value corresponding to the intensity of the outside light sensed by each exposed pixel of the imaging element 241.

Figure 3:
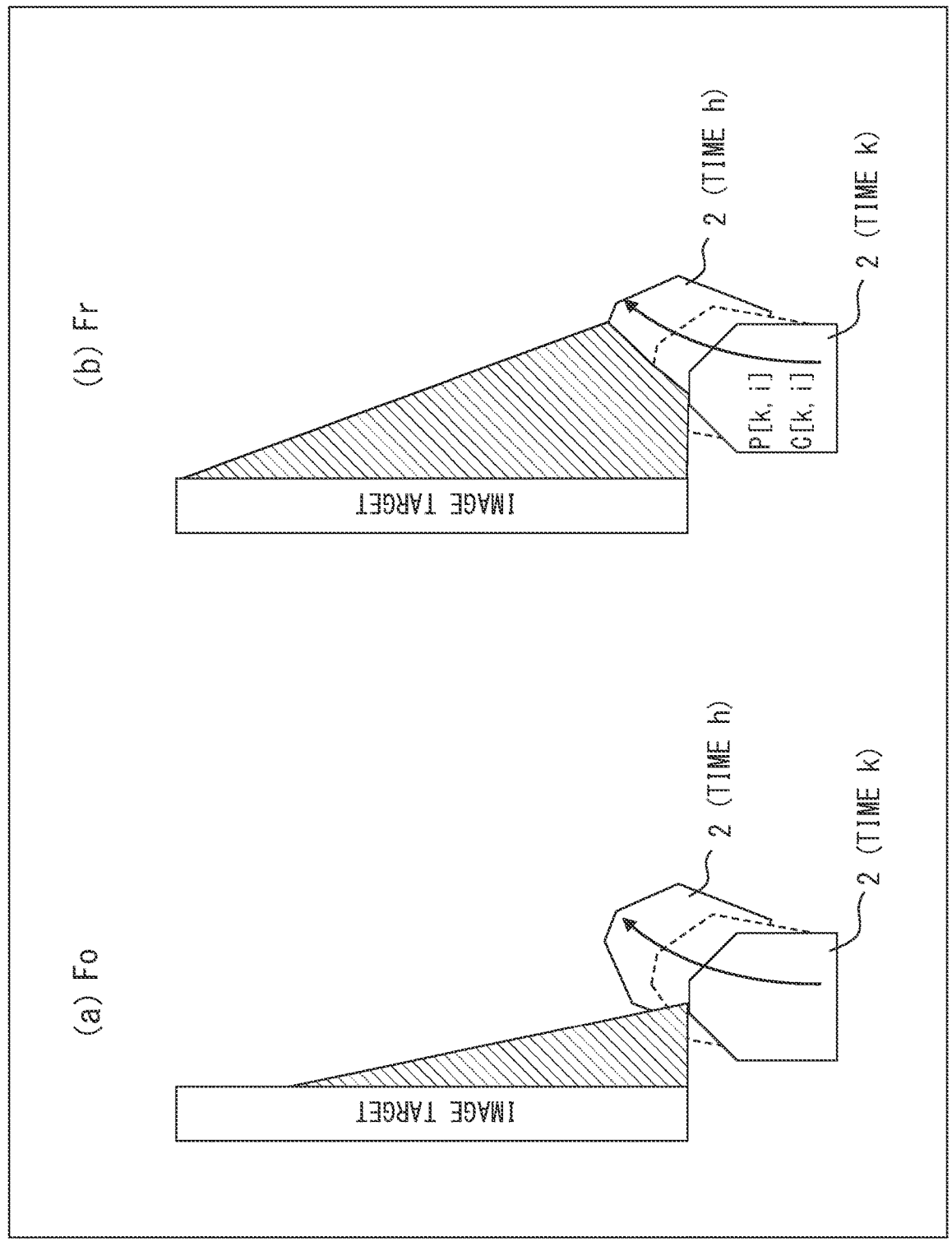
FIG. 3 is a schematic diagram illustrating an external camera (a) and an optical sensor according to the first embodiment.
Figure 4:
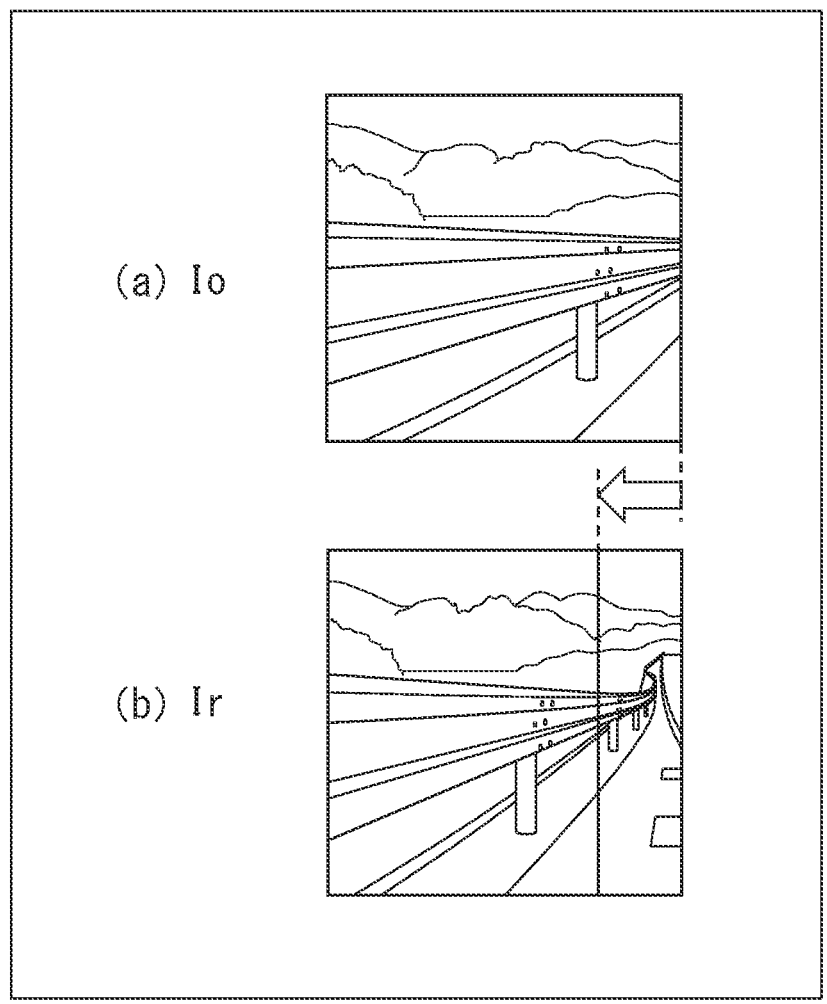
FIG. 4 is a schematic diagram for explaining an outside light image (a) and a reflection distance image (b) according to the first embodiment.

For the global shutter frame Fo when the entire scanning lines are scanned by the external camera 24, a frame period that is an image capturing period shorter than that of the rolling shutter frame Fr when the entire scanning lines are scanned by the optical sensor 22 and a start timing close to that of the rolling shutter frame Fr are set. As a result, when the start timings of the frames Fo, Fr are precisely synchronized with each other as shown in FIG. 3, the reflection distance image Ir of a range of the outside wider than that of the outside light image Io is acquired and compressed as shown in FIG. 4. Note that FIG. 4 does not show the images Ir, Io as it is, but schematically show the views captured in the images Ir, Io.

As shown in FIG. 1, the error estimation device 1 according to the first embodiment is connected with the components 20, 22, 24 of the sensor system 2 through at least one of LAN (Local Area Network), a wire harness, an internal bus, or the like. The error estimation device 1 includes at least one dedicated computer. The dedicated computer included in the error estimation device 1 may be an ECU (Electronic Control Unit) of a locator configured to estimate the position of the vehicle 3. The dedicated computer included in the error estimation device 1 may be an ECU configured to control an advanced driving assistance or an automated driving of the vehicle 3. The dedicated computer included in the error estimation device 1 may be an ECU configured to control a communication between the vehicle 3 and an external device.

The error estimation device 1 including such dedicated computer has at least one memory 10 and at least one processor 12. The memory 10 is at least one type of non-transitory tangible storage medium, such as a semiconductor memory, a magnetic medium, and an optical medium, for non-transitory storage of computer readable programs and data. The processor 12 includes, as a core, at least one type of, for example, a CPU (Central Processing Unit), a GPU (Graphics Processing Unit), an RISC (Reduced Instruction Set Computer) CPU, and so on. The processor 12 executes multiple instructions included in an error estimation program stored in the memory 10. Accordingly, the error estimation device 1 builds functional blocks for performing an estimation process for estimating a bias error B occurring in the inertial sensor 20 as shown in FIG. 2. Hereinafter, the estimation process for estimating the bias error B may be referred to as an error estimation process.

The functional blocks built by the error estimation device 1 includes an error correction block 100, a motion compensation block 120, a difference extraction block 140, a determination block 160, and an error prediction block 180.

Further, the latest bias error B that was predicted by the error prediction block 180 and stored in the memory 10 as described later is input to (read by) the error correction block 100. The latest inertial information Ib acquired by the inertial sensor 20 at a time k is input to the error correction block 100. The time k is the start timing of the global shutter frame Fo (see FIG. 3).

Based on the above inputs, the error correction block 100 is configured to correct the latest inertial information Ib using the bias error B. This correction is realized by subtracting the bias error B from the inertial information Ib.

Figure 5:
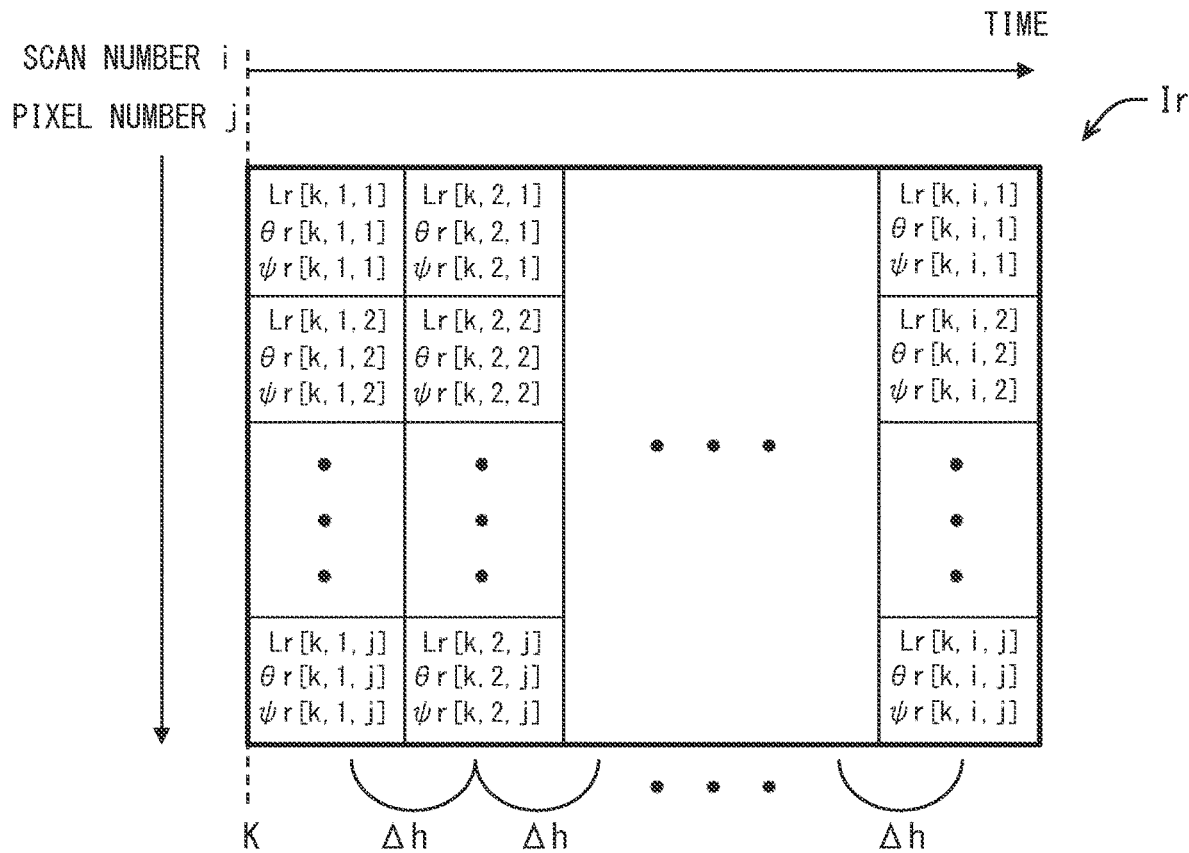
FIG. 5 is a schematic diagram for explaining a motion compensation block according to the first embodiment.

The corrected inertial information Ib at the time k which is corrected by the error correction block 100 using the bias error B is input to the motion compensation block 120 shown in FIG. 2. The latest reflection distance image Ir acquired by the optical sensor 22 in the global shutter frame Fo whose start timing is the time k is also input to the motion compensation block 120. As shown in FIG. 5, the latest reflection distance image Ir includes, as the latest data values, the distance value Lr[k, i, j], the beam steering angle θr[k, i, j], and ψr[k, i, j] for each pixel.

Here, [k, i, j] are indexes for identifying the latest data values Lr, θr, ψr, where "k" is the time k, "i" is the scan number i representing the row number and the scanning order, and "j" is the pixel number j in the scan number i. That is, Lr[k, i, j], θr[k, i, j], ψ[k, i, j] are input to the motion compensation block 120 as the latest data values of the scanning line having the scanning timing of the time h represented by the following formula 1 (see FIG. 3).

$$h \approx k + (i-1) \cdot \Delta h \qquad \text{[Formula 1]}$$

Figure 6:
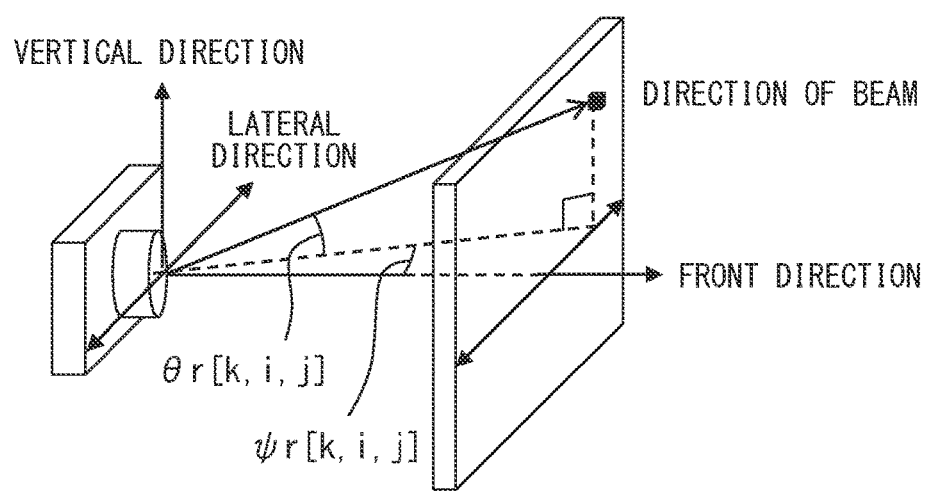
FIG. 6 is a schematic diagram for explaining the motion compensation block according to the first embodiment.

In the formula 1, the time h including the synchronization error time between the start timings of the frames Fo, Fr is approximately defined using the time k, the scan number i, and the time difference $\Delta h$ between the scanning lines (see FIG. 5). As shown in FIG. 6, θr[k, i, j] represents the beam steering angle in the vertical direction of the laser light that is emitted by the laser element 220 and sensed at the time h by the pixel of the imaging element 221 having the numbers i, j. ψr[k, i, j] represents the beam steering angle in the horizontal direction of the laser light that is emitted by the laser element 220 and sensed at the time h by the pixel of the imaging element 221 having the numbers i, j.

According to these inputs, the motion compensation block 120 compensates the latest data values of the reflection distance image Ir for the movement amount of the vehicle 3 during the global shutter frame Fo based on the inertial information Ib that was corrected using the bias error B. Specifically, the motion compensation block 120 calculates the position P[k, i] of the vehicle 3 and the direction cosine matrix C[k, i] at the time k using at least one of various navigation calculations based on the inertial information Ib that was corrected using the bias error B.

Here, [k, i] are indexes for identifying the calculation results P, C, where "k" represents the time k, and "i" represents the scan number i. That is, P[k, i] and C[k, i] are common in the pixels in the same scanning line. The motion compensation block 120 compensates the latest data values Lr[k, i, j], θr[k, i, j], and ψr[k, i, j] for the movement amount of the vehicle 3 which varies depending on the scan number i in the global shutter frame Fo by the following formula 2 using the calculation results P[k, i] and C[k, i]. As a result, the motion compensation block 120 calculates, for each pixel in the scanning line, a 3-D polar coordinate R[k, i, j] represented by the following formula 2 that is the latest data value of the reflection distance image Ir compensated for the vehicle movement amount. Hereinafter, the movement amount of the vehicle 3 during the global shutter frame Fo is referred to as the vehicle movement amount.

$$R[k, i, j] = Lr[k, i, j] \cdot C[k, i] \cdot \begin{bmatrix} \cos\theta r[k, i, j] \cdot \cos\Psi r[k, i, j] \\ \cos\theta r[k, i, j] \cdot \sin\Psi r[k, i, j] \\ \sin\theta r[k, i, j] \end{bmatrix} + P[k, i]$$ [Formula 2]

As shown in FIG. 2, the difference extraction block 140 includes the sub-block 142 configured to preprocess the reflection distance image Ir, the sub-block 144 configured to preprocess the outside light image Io, and the sub-block 146 configured to compare these preprocessed images Ir, Io.

The position P[k, 1] of the position P[k, i] calculated by the motion compensation block 120 and the direction cosine matrix C[k, 1] of the direction cosine matrix C[k, i] calculated by the motion compensation block 120 are input to the sub-block 142 of the difference extraction block 140. The reflection distance image Ir compensated for the vehicle movement amount by the motion compensation block 120 is also input to the sub-block 142.

According to these inputs, the sub-block 142 compensates the reflection distance image Ir for the error from the time k that is the start timing of the global shutter frame Fo. Specifically, the sub-block 142 converts, to the 3-D rectangular coordinate Rr[k, i, j] represented by the following formula 3, the 3-D polar coordinate R[k, i, j] of each pixel calculated by the motion compensation block 120 as the latest data value of the reflection distance image Ir compensated for the vehicle movement amount.

$$Rr[k,i,j] = C^T[k,1] \cdot R[k,i,j]$$ [Formula 3]

In the formula 3, the 3-D rectangular coordinate Rr[k, i, j] is defined by the transposed matrix CT[k, 1] that is the transpose of the direction cosine matrix C[k, 1] at the time k that is the start timing of the global shutter frame Fo, and the 3-D polar coordinate R[k, i, j] of the global shutter frame Fo. The sub-block 142 compensates, by the formula 4 using the position P[k, 1] at the time k, the 3-D rectangular coordinate Rr[k, i, j] of each pixel that is the latest data value of the converted reflection distance image Ir for the difference between the time h and the time k. As a result, the sub-block 142 calculates the relative rectangular coordinates x, y, z defined by the formula 4 as information about the relative position of the reflected point of the laser light corresponding to each pixel viewed from the vehicle 3 at the time k.

$$\begin{bmatrix} x \\ y \\ z \end{bmatrix} = Rr[k, i, j] - P[k, 1]$$ [Formula 4]

The sub-block 142 further converts the calculated relative rectangular coordinates x, y, z of each pixel by the following formulas 5-7. As a result, the sub-block 142 calculates the distance value Lr[k, i, j], the beam steering angle θr[k, i, j], and ψr[k, i, j] as the latest data values of the reflection distance image Ir that was compensated for the error according to the time k.

$$Lr[k, r, j] = \sqrt{x^2 + y^2 + z^2}$$ [Formula 5]

$$\theta r[k, i, j] = \tan^{-1} \frac{z}{\sqrt{x^2 + y^2}}$$ [Formula 6]

$$\Psi r[k, i, j] = \tan^{-1} \frac{y}{x}$$ [Formula 7]

Figure 7:
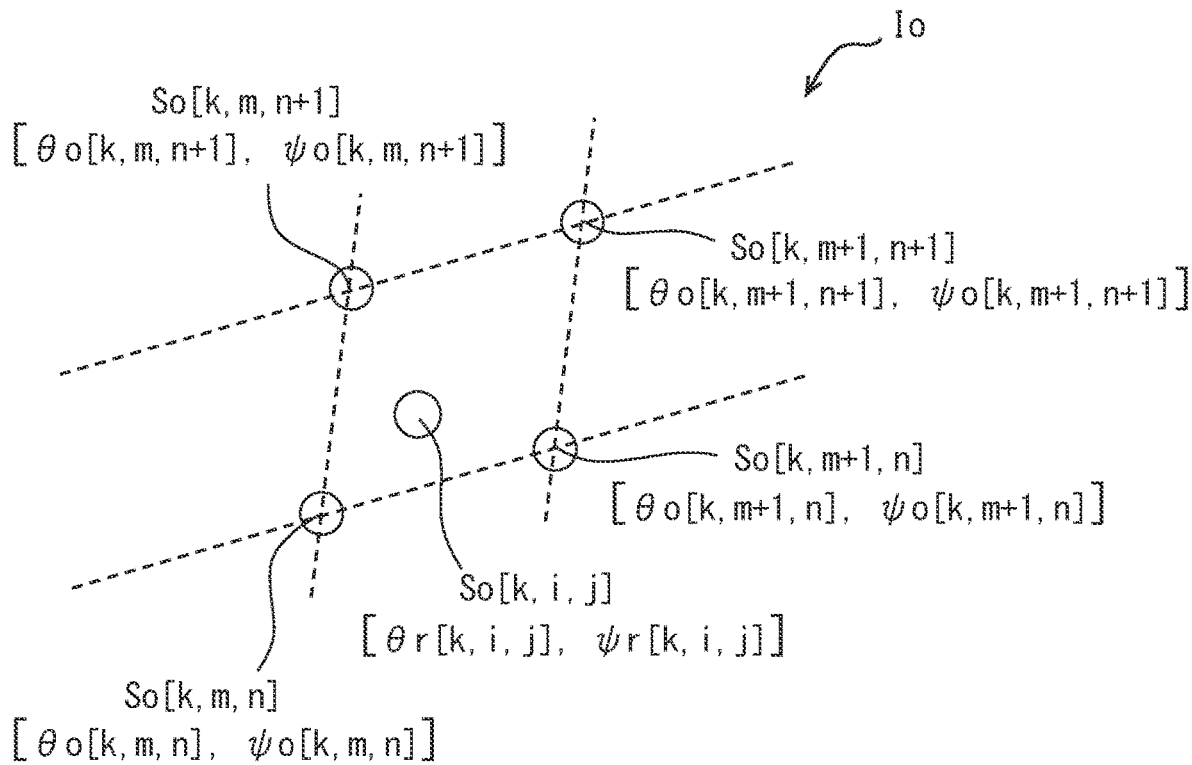
FIG. 7 is a schematic diagram for explaining the difference extraction block according to the first embodiment.

The beam steering angle θr[k, i, j] and ψr[k, i, j] which are the latest data values of the reflection distance image Ir calculated by the sub-block 142 are input to the sub-block 144 of the difference extraction block 140 shown in FIG. 2. The latest outside light image Io acquired by the external camera 24 in the global shutter frame Fo whose start timing is the time k is also input to the sub-block 144. As shown in FIG. 7, the latest outside light image Io includes, as the latest data values for each pixel, the luminance value So[k, m, n], the pixel angles θo[k, m, n], and ψo[k, m, n].

Here, [k, m, n] are indexes for identifying the latest data values So, θo, ψo, where "k" is the time k, "m" is the scan number m representing the row number, and the pixel number n in the scan number m. The maximum value of the scan number m for the outside light image Io is larger than the maximum value of the scan number i for the reflection distance image Ir, and the maximum value of the pixel number n for the outside light image Io is larger than the maximum value of the pixel number j for the reflection distance image Ir. That is, the outside light image Io is generated as a high-resolution image having a larger number of pixels than the reflection distance image Ir.

Figure 8:
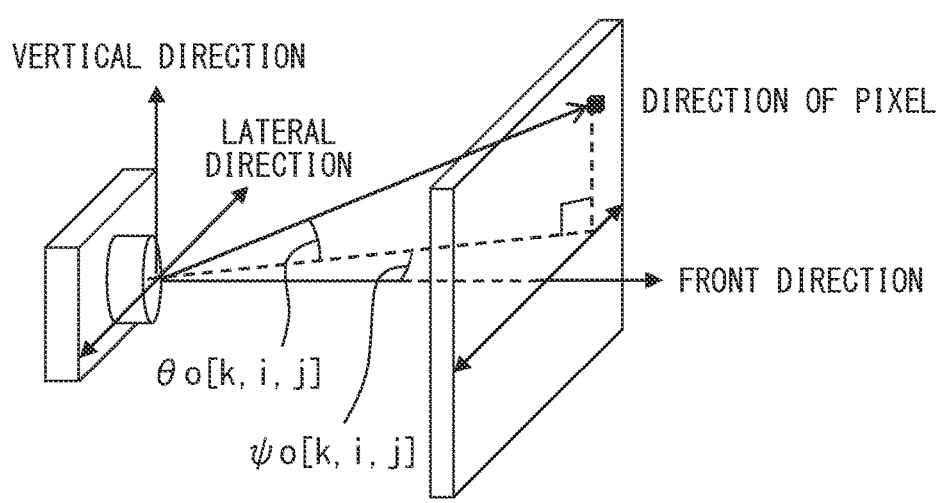
FIG. 8 is a schematic diagram for explaining the difference extraction block according to the first embodiment.

As shown in FIG. 8, θo[k, m, n] represents the pixel angle in the vertical direction of the outside light sensed by the pixel having the numbers m, n of the imaging element 241 at the time k. The ωo[k, m, n] represents the pixel angle in the horizontal direction of the outside light sensed by the pixel having the numbers m, n of the imaging element 241 at the time k.

According to these inputs, the sub-block 144 performs the interpolation to match the high-resolution one of the reflection distance image Ir and the outside light image Io to the low-resolution one. That is, the sub-block 144 performs the interpolation to match the high-resolution outside light image Io to the low-resolution reflection distance image Ir. Specifically, the sub-block 144 searches the pixel angles θo, ψo that satisfy the following formulas 8, 9 for the beam steering angles θr[k, i, j], ψ[k, i, j] of each pixel as shown in FIG. 7.

$$\theta o[k,m,n] < \theta r[k,i,j] \leq \theta o[k,m+1,n] \qquad \text{[Formula 8]}$$

$$\Psi o[k,n] < \Psi r[k,i,j] \leq \Psi o[k,m,n+1] \qquad \text{[Formula 9]}$$

In the formula 8, the indexes of the horizontally adjacent pixels are represented as [k, m, n] and [k, m+1, n]. In the above formula 8, the searching range for the beam steering angle θr[k, i, j] is defined by the θo[k, m, n] and the θo[k, m+1, n]. In the formula 9, the indexes of the vertically adjacent pixels are represented as [k, m, n] and [k, m, n+1]. In the above formula 9, the searching range for the pixel angle ψr[k, i, j] is defined by the pixel angles wo[k, m, n] and wo[k, m, n+1]. The sub-block 144 is configured to calculate the luminance values So[k, i, j] of the pixel of the outside light image Io corresponding to the beam steering angle θr[k, i, j] and ψr[k, i, j] for each pixel by the interpolation using the following formulas 10-12 (see FIG. 7).

$$S1 = \frac{\theta r[k, i, j] - \theta o[k, m, n]}{\theta o[k, m+1, n] - \theta o[k, m, n]} \cdot \qquad \text{[Formula 10]}$$
$$(So[k, m+1, n] - So[k, m, n]) + So[k, m, n]$$

$$S2 = \frac{\theta r[k, i, j] - \theta o[k, m, n+1]}{\theta o[k, m+1, n+1] - \theta o[k, m, n+1]} \cdot \qquad \text{[Formula 11]}$$
$$(So[k, m+1, n+1] - So[k, m, n+1]) + So[k, m, n+1]$$

$$So[k, i, j] = \frac{\Psi r[k, i, j] - \Psi o[k, m, n]}{\Psi o[k, m, n+1] - \Psi o[k, m, n]} \cdot (S2 - S1) + S1 \qquad \text{[Formula 12]}$$

In the formula 10, the indexes of the horizontally adjacent pixels are represented as [k, m, n] and [k, m+1, n]. In the formula 10, the valuable S1 is defined by the pixel angles θo[k, m, n], θo[k, m+1, n], the corresponding luminance values So[k, m, n], So[k, m+1, n], and the beam steering angle θr[k, i, j].

In the formula 11, the indexes of the vertically adjacent pixels are represented as [k, m, n] and [k, m, n+1]. In the formula 11, the indexes of the pixel vertically adjacent to the pixel having the indexes of [k, m+1, n] which is horizontally adjacent to the pixel having the indexes of [k, m, n] are represented by [k, m+1, n+1] (see FIG. 7). That is, in the formula 11, the indexes of the pixel horizontally adjacent to the pixel having the indexes of [k, m, n+1] which is vertically adjacent to the pixel having the indexes of [k, m, n] are represented by [k, m+1, n+1] (see FIG. 7). In the formula 11, the valuable S2 is defined by the pixel angles θo[k, m, n+1], θo[k, m+1, n+1], the corresponding luminance values So[k, m, n+1], So[k, m+1, n+1], and the beam steering angle θr[k, i, j].

In the formula 12, the indexes of the vertically adjacent pixels are represented as [k, m, n] and [k, m, n+1]. In the formula 12, the luminance value So[k, i, j] of the interpolated outside light image Io is defined by the pixel angles ψo[k, m, n], ψo[k, m, n], the valuables S1, S2 of the formulas 10, 11, and the beam steering angle ψr[k, i, j].

The distance value Lr[k, i, j] is input to the sub-block 146 of the difference extraction block 140 shown in FIG. 2 as the latest data value of the reflection distance image Ir calculated by the sub-block 142. According to this input, the sub-block 146 extracts edges in the latest reflection distance image Ir by at least one of various filtering processing to the distance value Lr[k, i, j]. As a result, the sub-block 146 calculates the difference in the distance values Lr[k, i, j] of the horizontally or vertically adjacent pixels as an edge image value Lre[k, i, j] for each pixel corresponding to the extracted edges.

The luminance value So[k, i, j] is input to the sub-block 146 as the latest data value of the outside light image Io which was interpolated by the sub-block 144. According to this input, the sub-block 146 extracts edges in the latest outside light image Io by at least one of various filtering processing to the luminance value So[k, j]. As a result, the sub-block 146 calculates the difference in the luminance values So[k, i, j] of the horizontally or vertically adjacent pixels as an edge image value Soe[k, i, j] for each pixel corresponding to the extracted edges.

The sub-block 146 extracts the difference E[k, i, j] between the images Io, Ir by comparing the edge image values Lre[k, i, j] and Soe[k, i, j] of the reflection distance image Ir and the outside light image Io for each pixel. Specifically, the sub-block 146 calculates, by the formula 13, the difference E[k, i, j] between the images by comparing the edge image value Lre[k, i, j] with the edge image value Soe[k, i, j] having the same index after normalizing by the variance range respectively. That is, the sub-block 146 normalizes the edge image value Lre[k, i, j] of the reflection distance image Ir and the edge image value Soe[k, i, j] of the outside light image Io based on each variance range, and then compares the edge image values to extract the difference.

$$E[k, i, j] = \frac{Lre[k, i, j]}{Lre\max[k, i, j] - Lre\min[k, i, j]} - \frac{Soe[k, i, j]}{Soe\max[k, i, j] - Soe\min[k, i, i]} \qquad \text{[Formula 13]}$$

In the first term on the right-hand side of the above formula 13, the Lremax[k, i, j] is the maximum value of the edge image value Lre[k, i, j] of the reflection distance image Ir, and the Lremin[k, i, j] is the minimum value of the edge image value Lre[k, i, j] of the reflection distance image Ir. In the first term on the right-hand side of the above formula 13, the edge image value Lre[k, i, j] is normalized (made dimensionless) using the variance range calculated by subtracting the minimum value Lremin[k, i, j] from the maximum value Lremax[k, i, j].

In the second term on the right-hand side of the above formula 13, Soemax[k, i, j] is the maximum value of the edge image value Soe[k, i, j] of the outside light image Io, and the Soemin[k, i, j] is the minimum value of the edge image value Soe[k, i, j] of the outside light image Io. In the second term on the right-hand side of the above formula 13, the edge image value Soe[k, i, j] is normalized (made dimensionless) using the variance range calculated by subtracting the minimum value Soemin[k, i, j] from the maximum value Soemax[k, i, j].

The difference E[k, i, j] between the latest images Io, Ir extracted by the sub-block 146 of the difference extraction block 140 is input to the determination block 160 shown in FIG. 2. According to this input, the determination block 160 determines, based on the difference E[k, i, j], whether to return the error estimation process to the step of estimating the bias error B by the error prediction block 180. That is, it is determined, based on the difference E[k, i, j], whether the bias error B needs to be repredicted by the return based on.

When the sum of squares of the difference E[k, i, j] between the edges of corresponding pixels is within the acceptable range, it is assumed that the prediction of the bias error B is accurate, and then the determination block 160 determines that it is unnecessary to predict again by the return. When it is determined that the return is unnecessary, the bias error B is used for correcting the inertial information Ib in the motion estimation of the vehicle 3, for example. Hereinafter, the sum of squares of the difference E[k, i, j] of each pixel is referred to as the sum of squares of the difference E[k, i, j].

When the sum of squares of the difference E[k, i, j] is out of the acceptable range, it is assumed that the prediction of the bias error B is inaccurate, and then the determination block 160 determines that it is necessary to predict again by the return. When it is determined that the return is necessary, the bias error B is predicted again by the error prediction block 180.

A numerical range at or below a threshold value which is an upper limit of the acceptable difference E[k, i, j] may be set as the acceptable range that is the determination criterion used by the error prediction block 180. A numerical range below a threshold value which is a lower limit of the unacceptable difference E[k, j] may be set as the acceptable range.

In response to the determination that an initial error estimation process is required after the vehicle 3 is started, the initial value of the bias error B stored in the memory 10 is input to (read by) the error prediction block 180 shown in FIG. 2. According to this input, the error prediction block 180 provisionally predicts the latest bias error B at time k and stores the bias error B to the memory 10. The initial value of the bias error B may be a preset constant value. The initial value of the bias error B may be a variable value predicted in the past error estimation process.

When the determination block 160 determines that the return is necessary, the inaccurate bias error B is input to (read by) the error prediction block 180 from the memory 10. According to this input, the error prediction block 180 predicts the latest bias error B at the time k by adding the error adjusting value to the inaccurate bias error B, and stores it to the memory 10. At this time, the error prediction block 180 adjusts the sign and the difference of the error adjusting value from the initial value according to the difference between the difference E[k, i, j] extracted this time and the difference E[k, i, j] extracted in the previous time. When it is determined that the return is necessary, the initial value of the error adjusting value stored in the memory 10 is also input to (read by) the error prediction block 180. The initial value of the error adjusting value may be a preset constant value. The initial value of the error adjusting value may be a variable value predicted in the past error estimation process.

In the first embodiment, the error correction block 100 corresponds to an error correction unit, and the motion compensation block 120 corresponds to a motion compensation unit. In the first embodiment, the difference extraction block 140 corresponds to a difference extraction unit, the determination block 160 corresponds to a determination unit, and the error prediction block 180 corresponds to an error prediction unit.

Figure 9:
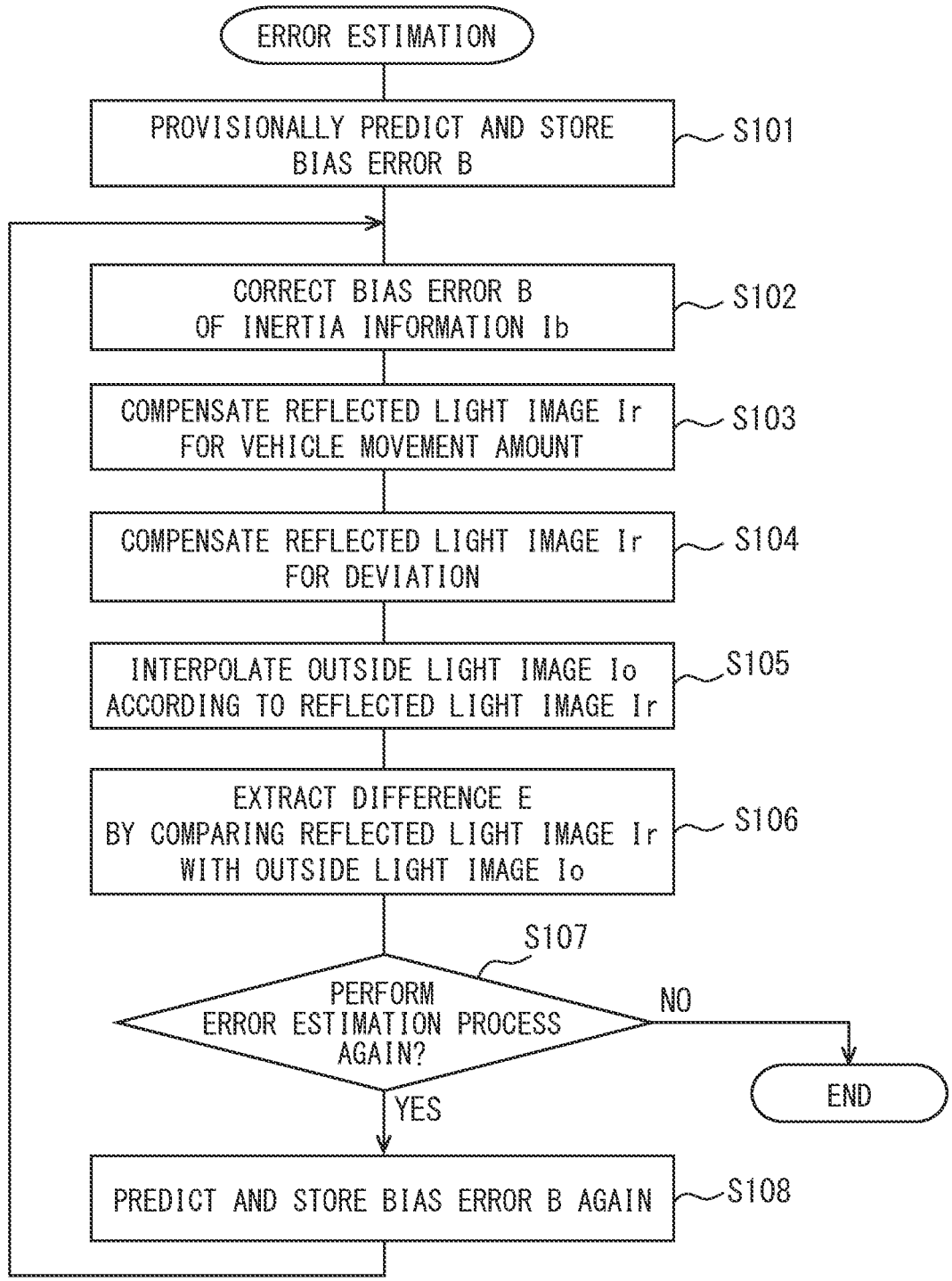
FIG. 9 is a flowchart illustrating an error estimation method according to the first embodiment.

The process of the error estimation method realized by the error estimation device 1 using the functional blocks 100, 120, 140, 160, 180 will be described with reference to FIG. 9. This process is performed for each global shutter frame Fo repeated after the vehicle 3 starts traveling. Further, in this flow, "S" means steps of the process executed by instructions included in the error estimation program. Moreover, the indexes are omitted in the following description.

In S101, the error prediction block 180 provisionally predicts, as the initial value stored in the memory 10, the bias error B occurring in the inertial sensor 20 at the time k when the global shutter frame Fo is started.

In S102, the error correction block 100 corrects the latest bias error B, which is predicted in S101 or S108, of the latest inertial information Ib acquired by the inertial sensor 20 at the time k.

In S103, the motion compensation block 120 compensates the latest reflection distance image Ir acquired by the optical sensor 22 in the global shutter frame Fo having the start time k for the vehicle movement amount in the global shutter frame Fo. The compensation is performed based on the inertial information Ib corrected by the bias error B in S102.

In S104, the sub-block 142 of the difference extraction block 140 compensates, for the deviation from the time k which is the start timing of the global shutter frame Fo, the reflection distance image Ir compensated for the vehicle movement amount in S103.

In S105, the sub-block 144 of the difference extraction block 140 interpolates the latest outside light image Io acquired by the external camera 24 in the global shutter frame Fo starting at the time k to match the reflection distance image Ir compensated in S104. The interpolation is performed to match the high-resolution outside light image Io to the low-resolution reflection distance image Ir.

In S106, the sub-block 146 of the difference extraction block 140 extracts the difference E by comparing the reflection distance image Ir compensated in S104 with the outside light image Io interpolated in S105. The comparison and the difference extraction are performed on the edges after the image values Lre, Soe regarding the edges of the reflection distance image Ir and the outside light image Io are normalized using the variance ranges.

In S107, the determination block 160 determines whether to return the error estimation process to the step of predicting the bias error B based on the difference E extracted in S106. When it is determined that the return is unnecessary, this process is terminated.

In contrast, when it is determined that the return is necessary, in S108, the error prediction block 180 predicts the bias error B at the time k again and stores it to the memory 10, and then S102 is executed again. The re-prediction is realized by adjusting, based on the difference between the difference E extracted by the difference extraction block 140 in the current error estimation process and the difference E extracted by the difference extraction block 140 in the previous error estimation process, the error adjusting value that is added to the inaccurate bias error B.

In the above first embodiment, S101, S108 correspond to a prediction process, S102 corresponds to a correction process, and S103 corresponds to a compensation process. Further, in the first embodiment, S104, S105, S106 correspond to an extraction process, and S107 corresponds to a determination process.

(Effects)

Hereinbelow, effects of the above first embodiment will be described.

According to the estimation process of the first embodiment, the difference between the reflection distance image Ir acquired by the optical sensor 22 in the rolling shutter mode and the outside light image Io acquired by the external camera 24 in the global shutter mode is smaller as the prediction of the bias error B is more accurate. Since it is determined whether the bias error B needs to be repredicted based on the reflection distance image Ir and the outside light image Io, the estimation process is repeated until the bias error B is predicted accurately. Accordingly, the bias error B can be estimated accurately.

According to the estimation process of the first embodiment, the reflection distance image Ir is compensated for the vehicle movement amount. The reflection distance image Ir here is acquired by the optical sensor 22 in the rolling shutter mode, in which the pixels are sequentially exposed, during the global shutter frame Fo in which the outside light image Io is acquired by the external camera 24 in the global shutter mode in which all pixels are exposed simultaneously. In the reflection distance image Ir compensated for the vehicle movement amount based on the inertial information which was corrected using the bias error B, the difference extracted by comparing with the outside light image Io is smaller as the prediction of the bias error B is more accurate. Since it is determined whether to return the error estimation process to the step of predicting the bias error B based on the distance E between the reflection distance image Ir and the outside light image Io, the error estimation process is repeated until the bias error B is predicted accurately. Accordingly, the bias error B can be estimated accurately.

In the first embodiment, the reflection distance image Ir is compared with the outside light image Io after the reflection distance image Ir is compensated for the deviation from the start timing of the global shutter frame Fo. According to this, the reflection distance image Ir acquired by the sequential exposure by the optical sensor 22 in the rolling shutter mode during the global shutter frame Fo can be compensated to be an image acquired at the start timing of the global shutter frame Fo together with the outside light image Io. That is, since the compensated reflection distance image Ir can be assumed to be substantially acquired at the same time as the outside light image Io, the difference E is accurately extracted by comparing the images Ir, Io with each other, and accordingly the bias error B can be accurately estimated.

According to the first embodiment, the reflection distance image Ir and the outside light image Io are compared with each other after the interpolation for matching the high-resolution one to the low-resolution one. Accordingly, since the difference E can be accurately extracted by comparing the images Ir, Io after eliminating the non-matching between the images Ir, Io, the bias error B can be accurately estimated.

According to the first embodiment, the edges of the reflection distance image Ir and the outside light image Io are compared with each other. Since the difference E can be accurately extracted from the edges that can be easily compared with each other, the bias error B can be accurately estimated.

According to the first embodiment, the reflection distance image Ir and the outside light image Io are compared with each other after normalizing the image values Lre, Soe by the variance ranges. Accordingly, since the difference E can be accurately extracted by comparing the image values Lre, Soe with each other after scaling as a result of the normalization, the bias error B can be accurately estimated.

Second Embodiment

Figure 10:
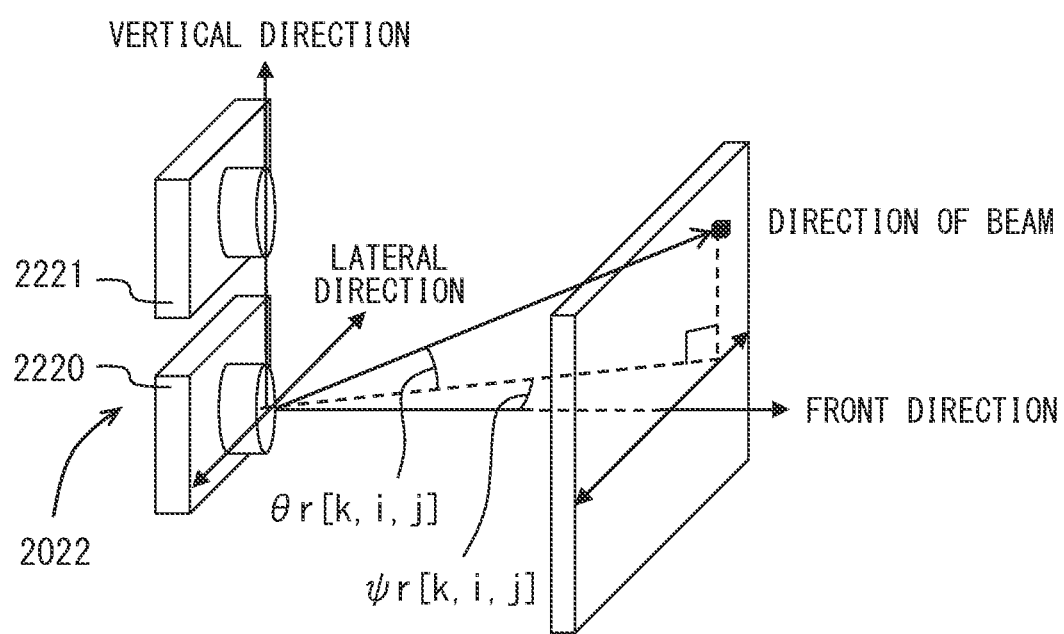
FIG. 10 is a schematic view for explaining an optical sensor according to a second embodiment.

A second embodiment shown in FIGS. 10, 11 is a modification of the first embodiment.

An optical sensor 2022 of the second embodiment is a so-called stereo camera configured to acquire a reflection distance image Ir that can be utilized for the motion estimation of the vehicle 3, for example. The optical sensor 2022 is configured to acquire the reflection distance image Ir according to the outside light from the reflection point in the outside of the vehicle 3 at which the outside light is reflected. Specifically, the optical sensor 2022 includes a first imaging element 2220, a second imaging element 2221, and an imaging circuit 2222.

The first imaging element 2220 and the second imaging element 2221 are arranged such that the optical centers are aligned in the vertical direction of the vehicle 3. The first imaging element 2220 includes a first imaging element 2220a, and the second imaging element 2221 includes a second imaging element 2221a. The imaging circuit 2222 captures the image in the rolling shutter mode by synchronically exposing and scanning the one or more vertical pixel lines of the imaging elements 2220a, 2221a in order. The imaging circuit 2222 is configured to generate the depth information for each pixel by triangulation operation based on the sensed information of each pixel in the scanning line that is synchronously scanned by the imaging elements 2220a, 2221a. The imaging circuit 2222 is configured to acquire the reflection distance image Ir by converting, to data in association with the beam steering angle corresponding to the pixels as the depth information for each pixel in the synchronously scanned line, the distance value to the reflection point of the outside light in the outside of the vehicle 3.

According to the second embodiment, even when the optical sensor 2022 configured to sense the reflected light of the outside light is used instead of the optical sensor 22 of the first embodiment configured to sense the reflected light of the laser light, the same effects as the first embodiment can be obtained.

OTHER EMBODIMENTS

Although multiple embodiments have been described above, the present disclosure is not construed as being limited to these embodiments, and can be applied to various embodiments and combinations within a scope that does not depart from the gist of the present disclosure.

The error estimation device 1 of the modification may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In one modification, in the sub-block 142 of the difference extraction block 140 and S104, the outside light image Io may be compensated for the deviation from the time k in the reflection distance image Ir. In one modification, the reflection distance image Ir may be a high-resolution image compared to the outside light image Io. In this case, the sub-block 144 of the difference extraction block 140 and S105, the interpolation may be performed to match the high-resolution reflection distance image Ir to the low-resolution outside light image Io.

In one modification, in the sub-block 142, 146 of the difference extraction block 140, S104, and S106, the luminance value included in the reflected wave image Ir in association with the distance value Lr may be used instead of the distance value Lr. In one modification, in the sub-block 146 of the difference extraction block 140 and S106, the distance value Lr of the reflection distance image Ir and the luminance value So of the outside light image Io may be used as the image values for the comparison and the difference extraction. In one modification, in the sub-block 146 of the difference extraction block 140 S106, the luminance values So of the reflection distance image Ir and the outside light image Io may be used for the comparison and the difference extraction after normalizing to match one to another.

What is claimed is:

1. An error estimation device configured to perform an estimation process for a bias error occurring in an inertial sensor configured to acquire inertial information, wherein the inertial sensor is mounted in a vehicle together with an optical sensor and an external camera, the optical sensor is configured to acquire a reflection distance image according to a distance to a reflection point of light sensed from an outside of the vehicle, and the external camera is configured to acquire an outside light image according to outside light sensed from the outside, the error estimation device comprising:
an error prediction unit configured to predict the bias error; and
a determination unit configured to determine whether the bias error needs to be repredicted by the error prediction unit based on the reflection distance image acquired by the optical sensor in a rolling shutter mode and the outside light image acquired by the external camera in a global shutter mode.

2. The error estimation device according to claim 1, further comprising:
a motion compensation unit configured to compensate, based on the inertial information that was corrected using the predicted bias error, the reflection distance image for a compression caused by a motion of the vehicle, wherein
the determination unit is configured to determine, based on the compensated reflection distance image and the outside light image, whether the bias error needs to be repredicted.

3. The error estimation device according to claim 2, further comprising:
a difference extraction unit configured to extract a difference between the compensated reflection distance image and the outside light image by comparing the compensated reflection distance image with the outside light image, wherein
the determination unit is configured to determine whether the bias error needs to be repredicted based on the extracted difference.

4. An error estimation device configured to perform an estimation process for a bias error occurring in an inertial sensor configured to acquire inertial information, wherein the inertial sensor is mounted in a vehicle together with an optical sensor and an external camera, the optical sensor is configured to acquire a reflection distance image according to a distance to a reflection point of light sensed from an outside of the vehicle, and the external camera is configured to acquire an outside light image according to outside light sensed from the outside, the error estimation device comprising:
an error prediction unit configured to predict the bias error;
an error correction unit configured to correct the inertial information using the predicted bias error;
a motion compensation unit configured to compensate, for a movement amount of the vehicle in a shutter frame when the outside light image is acquired by the external camera in a global shutter mode in which all pixels of the external camera are exposed simultaneously, the reflection distance image acquired in the shutter frame by the optical sensor in a rolling shutter mode in which pixels of the optical sensor are exposed sequentially, based on the corrected inertial information;
a difference extraction unit configured to extract a difference between the compensated reflection distance image and the outside light image by comparing the compensated reflection distance image and the outside light image; and
a determination unit configured to determine, based on the extracted difference, whether to return the estimation process to a step of predicting the bias error by the error prediction unit.

5. The error estimation device according to claim 3, wherein
the difference extraction unit is configured to compensate the reflection distance image for a deviation from a start timing of a shutter frame of the global shutter mode before comparing the reflection distance image with the outside light image.

6. The error estimation device according to claim 3, wherein
the difference extraction unit is configured to perform an interpolation to match a high-resolution one of the reflection distance image and the outside light image to a low-resolution one of the reflection distance image and the outside light image before comparing the reflection distance image with the outside light image.

7. The error estimation device according to claim 3, wherein
the difference extraction unit is configured to compare an edge in the reflection distance image with an edge in the outside light image.

8. The error estimation device according to claim 3, wherein
the difference extraction unit is configured to:
normalize an image value of the reflection distance image by a variance range of the image value of the reflection distance image and normalize an image value of the outside light image by a variance range of the image value of the outside light image; and
compare the image value of the reflection distance image with the image value of the outside light image.

9. The error estimation device according to claim 1, wherein
a time for acquiring an image in the rolling shutter mode is shorter than a time for acquiring an image in the global shutter mode.

10. A method for performing an estimation process for a bias error occurring in an inertial sensor configured to acquire inertial information, wherein the inertial sensor is mounted in a vehicle together with an optical sensor and an external camera, the optical sensor is configured to acquire a reflection distance image according to a distance to a reflection point of light sensed from an outside of the vehicle, and the external camera is configured to acquire an outside light image according to outside light sensed from the outside, the method comprising:
predicting the bias error;
determining whether the bias error needs to be repredicted based on the reflection distance image acquired by the optical sensor in a rolling shutter mode and the outside image acquired by the external camera in a global shutter mode.

11. The method according to claim 10, further comprising:
compensating, based on the inertial information that was corrected using the predicted bias error, the reflection distance image for a compression caused by a motion of the vehicle; and
determining whether the bias error needs to be repredicted based on the compensated reflection distance image and the outside light image.

12. The method according to claim 11, further comprising:
extracting a difference between the compensated reflection distance image and the outside light image by comparing the compensated reflection distance image with the outside light image; and
determining whether the bias error needs to be repredicted based on the extracted difference.

13. A method for performing an estimation process for a bias error occurring in an inertial sensor configured to acquire inertial information, wherein the inertial sensor is mounted in a vehicle together with an optical sensor and an external camera, the optical sensor is configured to acquire a reflection distance image according to a distance to a reflection point of light sensed from an outside of the vehicle, and the external camera is configured to acquire an outside light image according to outside light sensed from the outside, the method comprising:
predicting the bias error;
correcting the inertial information using the predicted bias error;
compensating, for a movement amount of the vehicle in a shutter frame when the outside light image is acquired by the external camera in a global shutter mode in which all pixels of the external camera are exposed simultaneously, the reflection distance image acquired in the shutter frame by the optical sensor in a rolling shutter mode in which pixels of the optical sensor are exposed sequentially, based on the corrected inertial information;
extracting a difference between the compensated reflection distance image and the outside light image by comparing the compensated reflection distance image and the outside light image; and
determining, based on the extracted difference, whether to return the estimation process to the step of predicting the bias error.

14. The method according to claim 12, further comprising:
compensating the reflection distance image for a deviation from a start timing of a shutter frame of the global shutter mode before comparing the reflection distance image with the outside light image.

15. The method according to claim 12, further comprising:
performing an interpolation to match a high-resolution one of the reflection distance image and the outside light image to a low-resolution one of the reflection distance image and the outside light image before comparing the reflection distance image with the outside light image.

16. The method according to claim 12, wherein
in the extracting the difference, an edge in the reflection distance image is compared with an edge in the outside light image.

17. The method according to claim 12, further comprising:
normalizing an image value of the reflection distance image by a variance range of the image value of the reflection distance image; and
normalizing an image value of the outside image by a variance range of the image value of the outside light image, wherein
in extracting the difference, the normalized image value of the reflection distance image is compared with the normalized image value of the outside image.

18. The method according to claim 10, wherein
a time for acquiring an image in the rolling shutter mode is shorter than a time for acquiring an image in the global shutter mode.

19. A computer program product stored on at least one non-transitory computer readable medium for performing an estimation process for a bias error occurring in an inertial sensor configured to acquire inertial information, wherein the inertial sensor is mounted in a vehicle together with an optical sensor and an external camera, the optical sensor is configured to acquire a reflection distance image according to a distance to a reflection point of light sensed from an outside of the vehicle, and the external camera is configured to acquire an outside light image according to outside light sensed from the outside, the computer program product comprising instructions configured to, when executed by at least one processor, cause the at least one processor to:
predict the bias error;
determine whether the bias error needs to be repredicted based on the reflection distance image acquired by the optical sensor in a rolling shutter mode and the outside image acquired by the external camera in a global shutter mode.

20. The computer program product according to claim 19, wherein the instructions are configured to, when executed by the at least one processor, further cause the at least one processor to:
compensate, based on the inertial information that was corrected using the predicted bias error, the reflection distance image for a compression caused by a motion of the vehicle; and
determine whether the bias error needs to be repredicted based on the compensated reflection distance image and the outside light image.

21. The computer program product according to claim 20, wherein the instructions are configured to, when executed by the at least one processor, further cause the at least one processor to:
extract a difference between the compensated reflection distance image and the outside light image by comparing the compensated reflection distance image with the outside light image; and determine whether the bias error needs to be repredicted based on the extracted difference.

22. A computer program product stored on at least one non-transitory computer readable medium for performing an estimation process for a bias error occurring in an inertial sensor configured to acquire inertial information, wherein the inertial sensor is mounted in a vehicle together with an optical sensor and an external camera, the optical sensor is configured to acquire a reflection distance image according to a distance to a reflection point of light sensed from an outside of the vehicle, and the external camera is configured to acquire an outside light image according to outside light sensed from the outside, the computer program product comprising instructions configured to, when executed by at least one processor, cause the at least one processor to:

predict the bias error;

correct the inertial information using the predicted bias error;

compensate, for a movement amount of the vehicle in a shutter frame when the outside light image is acquired by the external camera in a global shutter mode in which all pixels of the external camera are exposed simultaneously, the reflection distance image acquired in the shutter frame by the optical sensor in a rolling shutter mode in which pixels of the optical sensor are exposed sequentially, based on the corrected inertial information;

extract a difference between the compensated reflection distance image and the outside light image by comparing the compensated reflection distance image and the outside light image; and determine, based on the extracted difference, whether to return the estimation process to the step of predicting the bias error.

23. The computer program product according to claim 21, wherein the instructions are configured to, when executed by the at least one processor, further cause the at least one processor to:

compensate the reflection distance image for a deviation from a start timing of a shutter frame of the global shutter mode before comparing the reflection distance image with the outside light image.

24. The computer program product according to claim 21, wherein the instructions are configured to, when executed by the at least one processor, further cause the at least one processor to:

perform an interpolation to match a high-resolution one of the reflection distance image and the outside light image to a low-resolution one of the reflection distance image and the outside light image before comparing the reflection distance image with the outside light image.

25. The computer program product according to claim 21, wherein the instructions are configured to, when executed by the at least one processor, further cause the at least one processor to:

compare an edge in the reflection distance image with an edge in the outside light image to extract the difference the difference.

26. The computer program product according to claim 21, wherein the instructions are configured to, when executed by the at least one processor, further cause the at least one processor to:

normalize an image value of the reflection distance image by a variance range of the image value of the reflection distance image;

normalize an image value of the outside image by a variance range of the image value of the outside light image; and compare the normalized image value of the reflection distance image with the normalized image value of the outside image to extract the difference.

27. The computer program product according to claim 21, wherein a time for acquiring an image in the rolling shutter mode is shorter than a time for acquiring an image in the global shutter mode.

\* \* \* \* \*